(12) United States Patent
Meadows

(10) Patent No.: US 11,745,223 B2
(45) Date of Patent: Sep. 5, 2023

(54) ARTICLE SORTING SYSTEM

(71) Applicant: Ronald Meadows, Raceland, KY (US)

(72) Inventor: Ronald Meadows, Raceland, KY (US)

(73) Assignees: WYNRIGHT CORPORATION, Elk Grove, IL (US); DAIFUKU CO., LTD., Osaka (JP)

( * ) Notice: Subject to any disclaimer, the term of this patent is extended or adjusted under 35 U.S.C. 154(b) by 22 days.

(21) Appl. No.: 17/355,523

(22) Filed: Jun. 23, 2021

(65) Prior Publication Data

US 2022/0410215 A1 Dec. 29, 2022

(51) Int. Cl.
*B07C 3/08* (2006.01)
*B65G 47/82* (2006.01)

(52) U.S. Cl.
CPC .............. *B07C 3/082* (2013.01); *B65G 47/82* (2013.01); *B65G 2201/0264* (2013.01)

(58) Field of Classification Search
CPC .. B07C 3/082; B65G 47/82; B65G 2201/0264
See application file for complete search history.

(56) References Cited

U.S. PATENT DOCUMENTS

| | | | | |
|---|---|---|---|---|
| 4,884,677 A | * | 12/1989 | Yu ........................ | B65G 47/844 198/370.02 |
| 8,776,982 B2 | * | 7/2014 | Onayama ............... | B65G 43/08 198/370.02 |
| 10,322,438 B2 | * | 6/2019 | Engel .................... | B65G 1/1373 |
| 10,640,303 B2 | * | 5/2020 | Kuhn ..................... | B65G 47/96 |
| 2007/0209906 A1 | * | 9/2007 | Ranger .................. | B65G 47/82 198/370.07 |
| 2012/0031731 A1 | * | 2/2012 | Onayama ............... | B65G 43/08 198/370.02 |
| 2016/0228917 A1 | * | 8/2016 | Woodgate ............. | B07B 1/4645 |

FOREIGN PATENT DOCUMENTS

JP 2009249121 A 10/2009

* cited by examiner

*Primary Examiner* — Michael McCullough
*Assistant Examiner* — Kalyanavenkateshware Kumar
(74) *Attorney, Agent, or Firm* — Dickinson Wright PLLC

(57) ABSTRACT

A system for sorting articles includes a plurality of article supporters attached to an endless chain. At least one diverting point is provided at which the articles may be removed. A plurality of lateral pushers are movable along the article supporter so as to selectively push the articles off the article supporters at the diverting point. A distributing mechanism initiates the movement of the lateral pushers. At least one diversion detection device is configured to identify a presence of each of the article supporters. A controller is configured to determine a slat number of each of the article supporters and to determine whether the article positioned on the article supporter associated with the detected slat number should be removed at the diverting point, and to actuate the distributing mechanism. The at least one diversion detection device is substantially aligned with the actuator in the direction of travel.

20 Claims, 20 Drawing Sheets

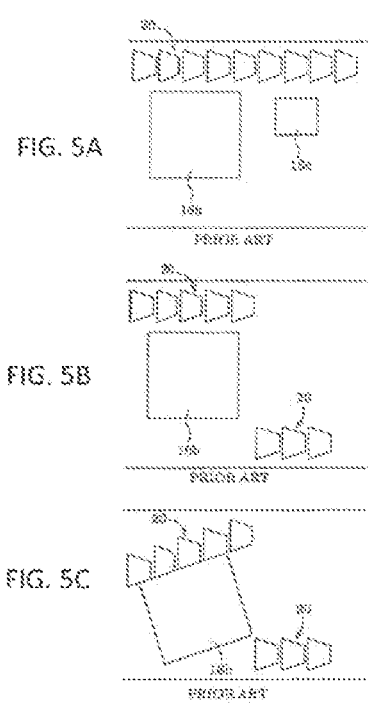

ARTICLE SORTING SYSTEM

TECHNICAL FIELD

The present invention relates to a system for sorting articles during conveyance of the articles.

BACKGROUND

Article sorting systems are known in the art for directing articles, such as packages or luggage items, to predetermined destinations. An example of such an article sorting system is disclosed in Japanese Patent Application Publication No. 2009249121 and presented herein in FIGS. 1-5C. The sorting system 100 includes a plurality of slats (article supporters) 18 on which articles 16 are placed and conveyed. The slats 18 are attached to an endless chain 14 which is driven by a motor to provide rotational movement of the endless chain 14 about a pair of sprockets 12a, 12b. A plurality of shoes 20 are each attached to one of the slats 18 and are configured to selectively move in a lateral direction in order to remove articles 16 from the slats 18 at predetermined diverting points 48. A distributing mechanism 104 is provided beneath the slats 18 and is configured to initiate the movement of the shoes 20. As best illustrated in FIG. 4, a pulse encoder 106 is used to determine when to activate the distributing mechanism 104 to initiate the movement of the shoes 20. The pulse encoder 106 is attached to a rotation shaft of one of the sprockets 12b and is configured to calculate a moving distance of the endless chain 14 based on pulses counted up by the pulse encoder 106, and to instruct the distributing mechanism 104 to initiate movement of the shoes 20 based on calculated distances that correlates with the diverting points 48.

Further article sorting systems have been developed to provide more precise location tracking of articles in order to provide more reliable timing of the removal of articles at diverting points 48. For example, as illustrated in FIGS. 6A and 6B, U.S. Pat. No. 8,776,982 to Daifuku Co. Ltd. (incorporated herein by reference in its entirety) discloses a sorting system with a different arrangement for determining a moving distance of the articles 16. More particularly, the system includes a plurality of detection plates 60 coupled with the slats 18, and a detection device 62 that is located in spaced relationship from a distributing mechanism 104 for detecting when the detection plates 60 (and associated slates 18) pass by the detection device 62, and based on factors such as a calculated speed of the slats 18 and distance between the detection device 62 and distributing mechanism 104, initiates the branching mechanism 104 to active shoes 20 to remove the articles 16.

There remains a need for further improvements to such sorting systems.

SUMMARY OF THE INVENTION

According to an aspect of the disclosure, a system for sorting articles includes a rotation drive device. An endless chain is rotatable along a conveyance route by the rotation drive device. A plurality of article supporters are attached to the endless chain for moving the articles in a direction of travel along the conveyance route by the endless chain. Each of the article supporters has a slat number associated with the article supporter. At least one diverting point is provided at which the articles may be removed from the article supporters. A plurality of lateral pushers are each attached to one of the article supporters. The lateral pushers are each movable along the article supporter so as to selectively laterally push the articles off of the article supporters at the at least one diverting point. A distributing mechanism is configured to initiate the movement of the lateral pushers. At least one diversion detection device is configured to identify a presence of each of the article supporters as the article supporters pass by the detection device in the direction of travel. A controller is configured to determine the slat number of each of the article supporters as the article supporters pass by the at least one diversion detection device to determine whether the article positioned on the article supporter associated with the detected slat number should be removed from the article supporter at the diverting point, and to actuate the distributing mechanism in response to a determination that the article should be removed from the article supporter. The at least one diversion detection device is substantially aligned with the distributing mechanism in the direction of travel such that the control system may actuate the distributing mechanism immediately after a determination that the article positioned on the article supporter associated with the detected slat number should be removed from the articles supporter.

According to another aspect of the disclosure, a method for sorting articles is provided. The method includes providing an endless chain that is rotatable along a conveyance route by a rotation drive device. The method also includes providing a plurality of article supporters attached to the endless chain for moving the articles in a direction of travel along the conveyance route by the endless chain. Each of the article supporters has a slat number associated with the article supporter. The method also includes providing at least one diverting point at which the articles may be removed from the article supporters. The method further includes providing a plurality of lateral pushers each attached to one of the article supporters, wherein the lateral pushers are each movable along the article supporter so as to selectively laterally push the articles off of the article supporters at the at least one diverting point. A distributing mechanism is configured to initiate the movement of the lateral pushers. The method also includes identifying a presence of each of the article supporters as the article supporters pass by the detection device in the direction of travel with at least one diversion detection device. The method further includes determining a slat number of each of the article supporters as the article supporters pass by the at least one diversion detection device with a controller to determine whether the article positioned on the article supporter associated with the detected slat number should be removed from the article supporter at the diverting point. The method also includes actuating the distributing mechanism in response to a determination that the article should be removed from the article supporter. The at least one diversion detection device is substantially aligned with the distributing mechanism in the direction of travel such that the control system may actuate the distributing mechanism immediately after a determination that the article positioned on the article supporter associated with the detected slat number should be removed from the articles supporter.

Because the diversion detection device is substantially aligned with the distributing mechanism in the direction of travel, the control system is capable of actuating the distributing mechanism immediately after a determination that the article should be diverted. Accordingly, variables such as slat speed, distance between the diversion detection device and distributing mechanism, and chain stretch do not need to be evaluated in determining when to active the distributing mechanism. As such, the system does not need to be undergo an initial calibration, and is able to effectively operate with the slats moving at any speed.

BRIEF DESCRIPTION OF THE DRAWINGS

Other aspects of the present disclosure will be readily appreciated, as the same becomes better understood by reference to the following detailed description when considered in connection with the accompanying drawings wherein:

FIGS. 5A-5C are top views of the conventional sorting system illustrating movement of an article with shoes;

DETAILED DESCRIPTION OF THE EXEMPLARY EMBODIMENTS

In the following description, details are set forth to provide an understanding of the present disclosure. In some instances, certain systems, structures and techniques have not been described or shown in detail in order not to obscure the disclosure.

Figure 7:
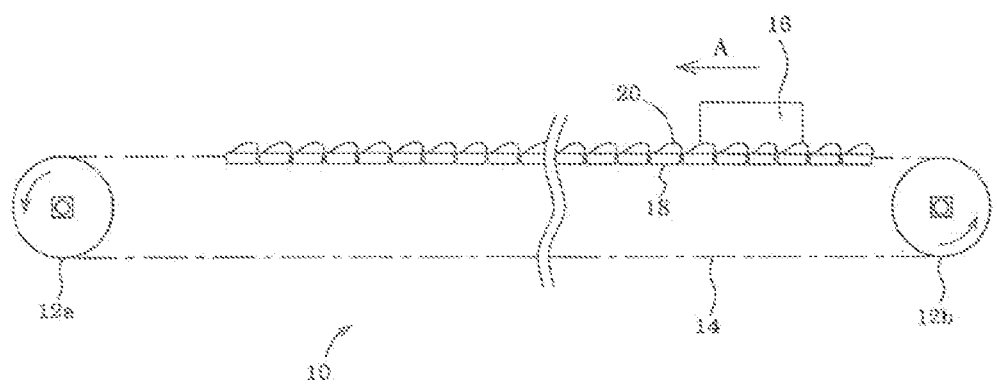
FIG. 7 is a side view of an improved sorting system according to an embodiment of the present disclosure, illustrating conveyance of an article.

An article sorting system 10, or "sorter" 10, is presented in FIGS. 7-19B. According to the subject disclosure, the term "article" 16 may include various objects, such as packages or luggage items, that me be shaped in various ways. As shown in FIG. 7, similar to the previous embodiment, the article sorting system 10 includes a plurality of articles supporters 18, or "slats" 18 upon which articles 16 are placed and conveyed in a direction of travel A. More particularly, the slats 18 are each attached to an endless chain 14 which is rotatable about a rotational drive device (sprocket) 12a and a driven sprocket 12b, with the rotational drive device 12a driving the endless chain 14 to convey the slats 18 in the direction of travel A. A plurality of lateral pushers 20, or "shoes" 20 are each attached to one of the slats 18 for moving the articles 16 laterally relative to the direction of travel to allow the articles 16 to be unloaded from the sorter 10 at diverting points 208 in response to one or more of the shoes 20 pushing the article 16. The system 10 further includes a controller (schematically shown in FIGS. 9 and 10), such as programmable automation controller for managing operation of the system 10

Figure 8:
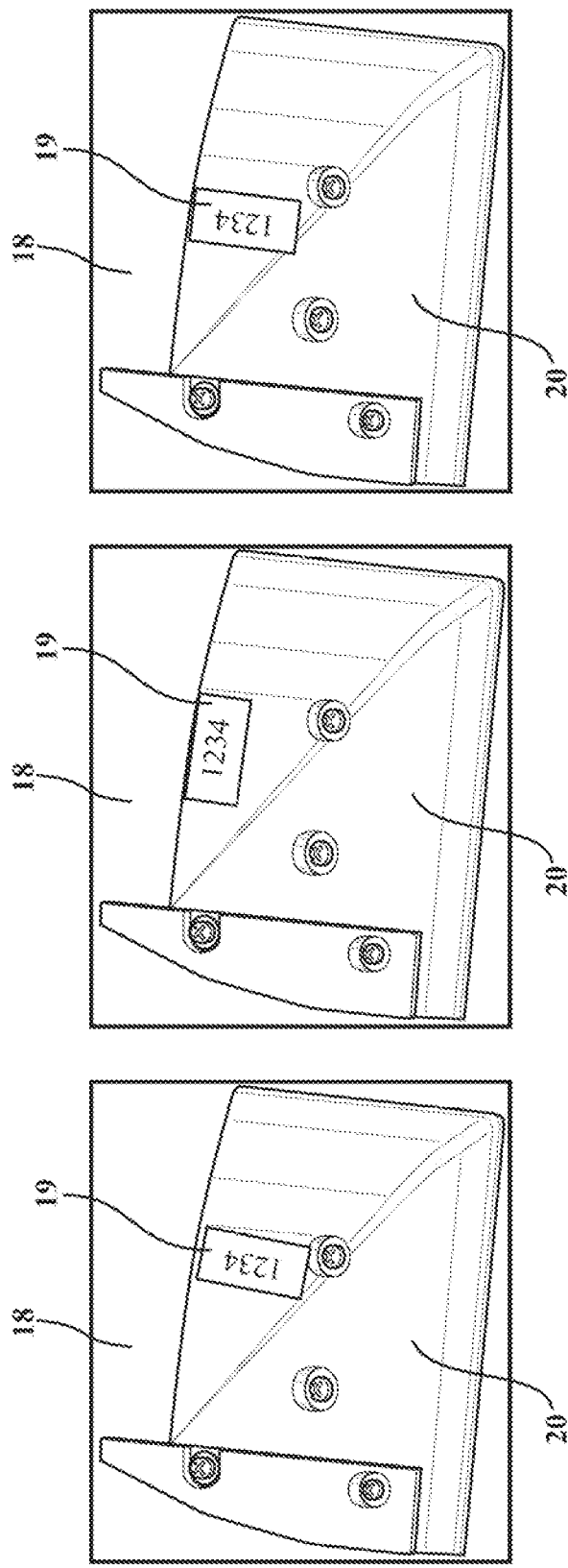
FIG. 8 is a top perspective view of numbered shoes of the improved sorting system.

Each of the slats 18 includes an associated identifying slat number that is used to electronically track movement of the articles 16 on the sorting system 10 via the controller 206. FIG. 8 illustrates an example of labels 19 that may be positioned on the slats 18 or other components of the slats 18 for visually indicating the slat numbers. In order to establish and monitor slat numbers, one of the slats 18 is designated a first reference slat 18a and established as slat number one. Slat numbers associated with subsequent slats 18 in a direction opposite the direction of travel are counted up from the first reference slat 18a, and the slat number count restarts upon a return to the first reference slat 18a.

Figure 1:
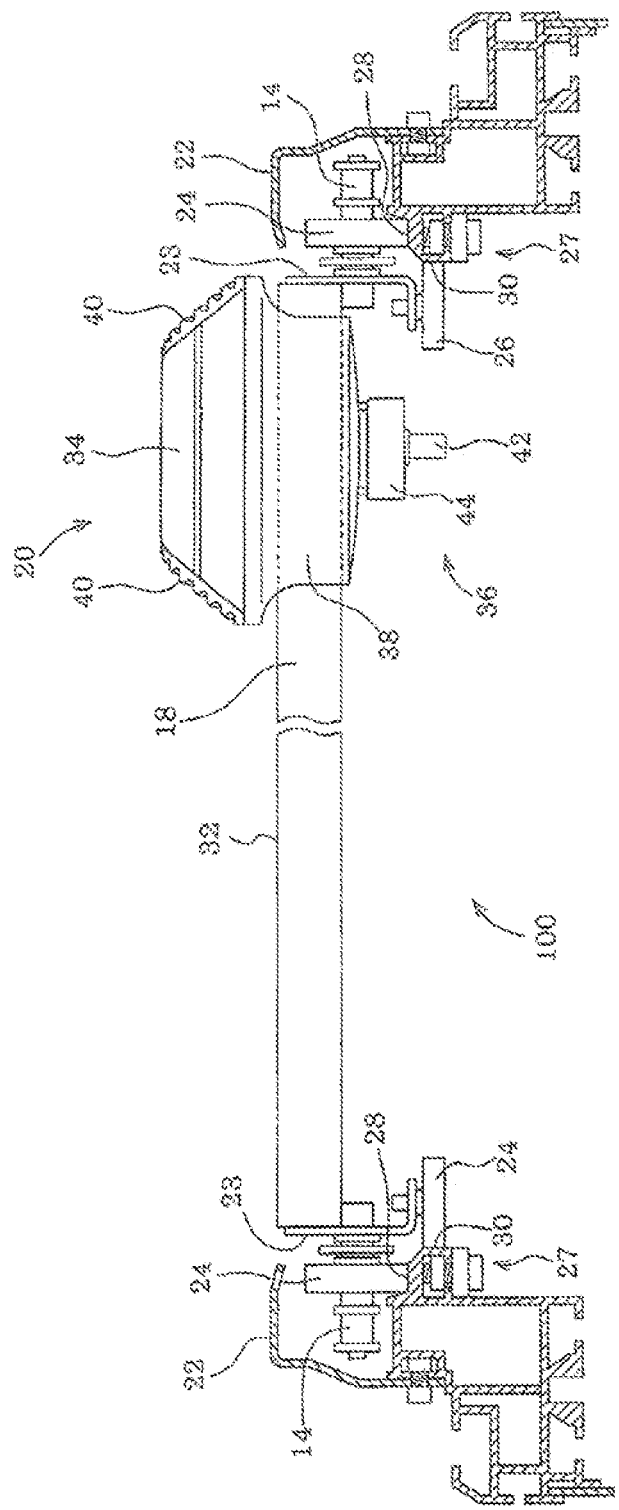
FIG. 1 is a front view of a conventional sorting system, illustrating a slat and a shoe.
Figure 2:
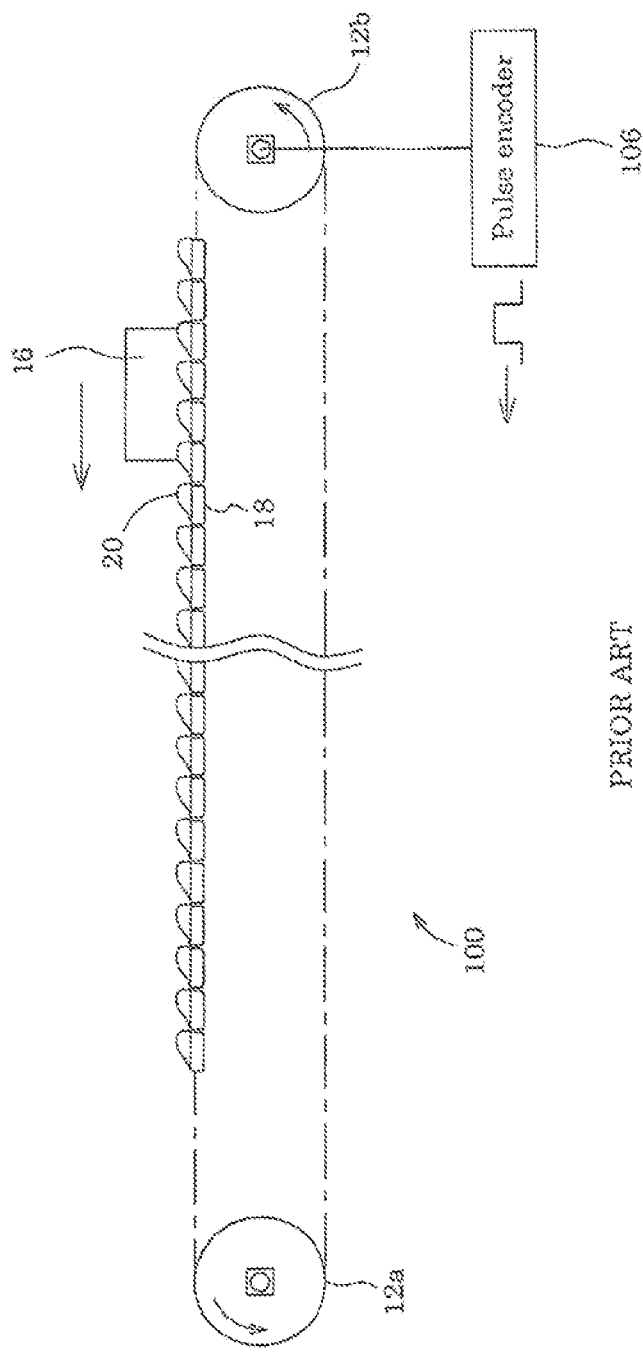
FIG. 2 is a side view of the conventional sorting system, illustrating conveyance of an article.
Figure 3:
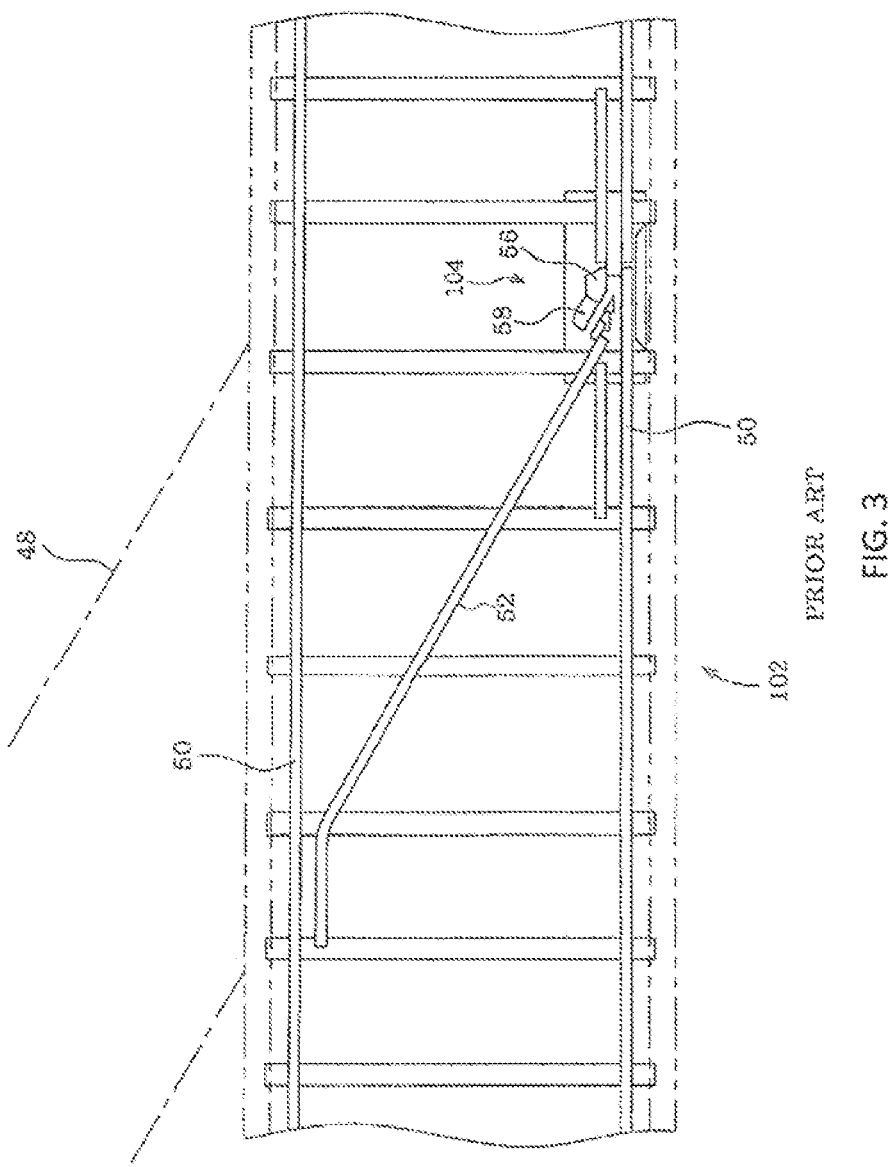
FIG. 3 is a top view of the conventional sorting system, illustrating a branching mechanism and distributing mechanism.
Figure 4:
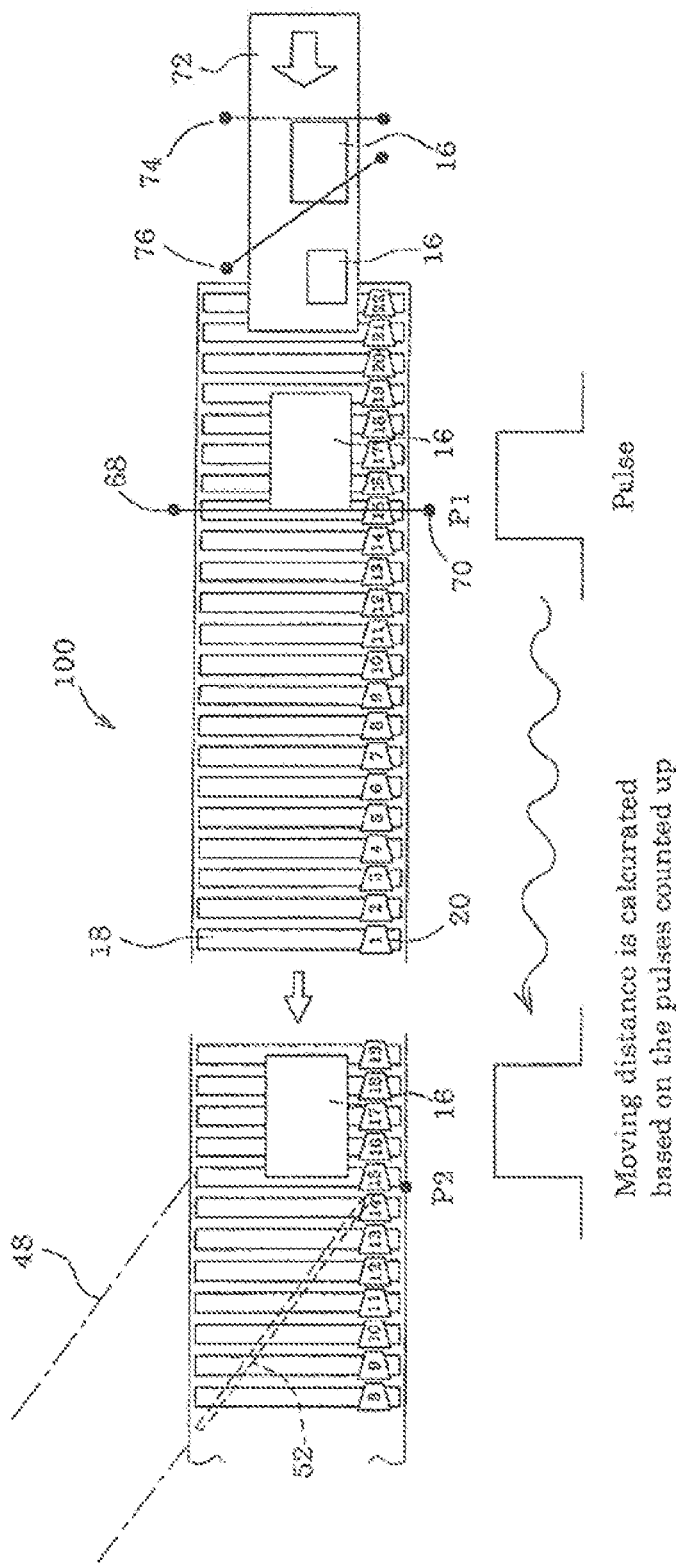
FIG. 4 is top view of the conventional sorting system, illustrating a pulse encoder system for tracking locations of slats.
Figure 6A:
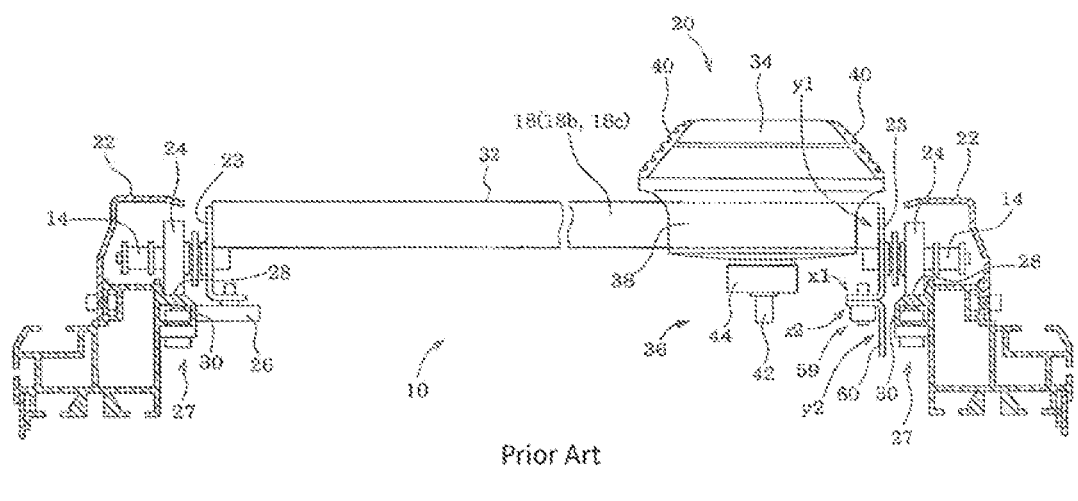
FIG. 6A is a front view of a further example of a known sorting system including a detection plate for determining a location of slats.
Figure 6B:
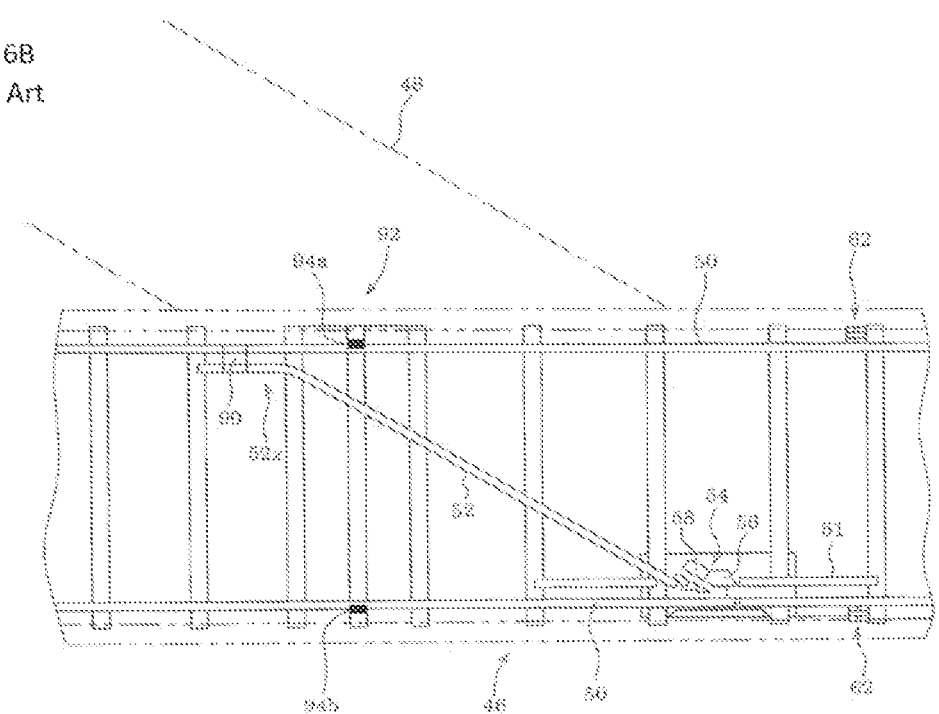
FIG. 6B is a top view of the further example of a known sorting system.

Consistent with FIG. 6 presenting the system of U.S. Pat. No. 8,776,982, the subject system 10 may include side brackets 23 respectively attached to both ends of each of the slat 18. The side brackets 23 have a plate shape and are bent so that a section in the direction of travel has an L shape. This L shape includes a horizontal part xl in the same direction relative to a placement surface 32, and an orthogonal part y1 in the orthogonal direction relative to the placement surface 32. An end of the orthogonal part y1 is attached to the end of the slat 18 by inserting, screwing, welding or the like. A movement roller 24 and a side roller 26 are attached to each of the side brackets 23. In order to support the slat 18, frames 27 are provided. Each of the frames 27 is provided with a slat rail 28 on which the movement roller 24 is moved, and a lateral guide surface 30 for guiding the side roller 26. The frames 27 are formed by an extruded aluminum material. The covers 22 are attached to the frames 27. The movement rollers 24 and the side rollers 26 stabilize going-around of the slat 18.

As shown, each of the slats 18 presents the article placement surface 32. The plurality of slats 18 each extend transversely to the direction of travel A and are positioned in spaced and parallel relationship with one another in the direction of travel A. As illustrated in FIG. 7, since a length of each of the slats 18 is typically more narrow than any given article 16, articles 16 typically occupy more than one slat 18 when positioned on the slats 18.

With reference back to FIG. 6, each of the shoes 20 is provided with an upper part 34 on the side of the placement surface 32, a lower part 36 on the opposite side of the upper part, and a side part 38 connecting the upper part 34 and the lower part 36. The shoe 20 encircles in a sectional view orthogonal to the direction of travel, and is attached so as to encircle part of the slat 18. When the article 16 is placed on the placement surface 32, the shoe 20 is arranged on one of the ends of the slat 18 and is configured to be moved laterally across the slat 18 to move the article 16.

The upper part 34 of the shoe 20 is provided with a surface 40 inclined relative to the direction of travel. This inclined surface 40 pushes the article 16 toward the side relative to the direction of travel. The lower part 36 of the shoe 20 is provided with a shoe pin 42, i.e., rotation shaft, and a guide roller 44 attached to the shoe pin 42. As will be further discussed in detail below, the guide roller 44 is configured to move in the direction of travel or obliquely relative to the direction of travel for providing corresponding movement of the shoe 20.

Figure 9:
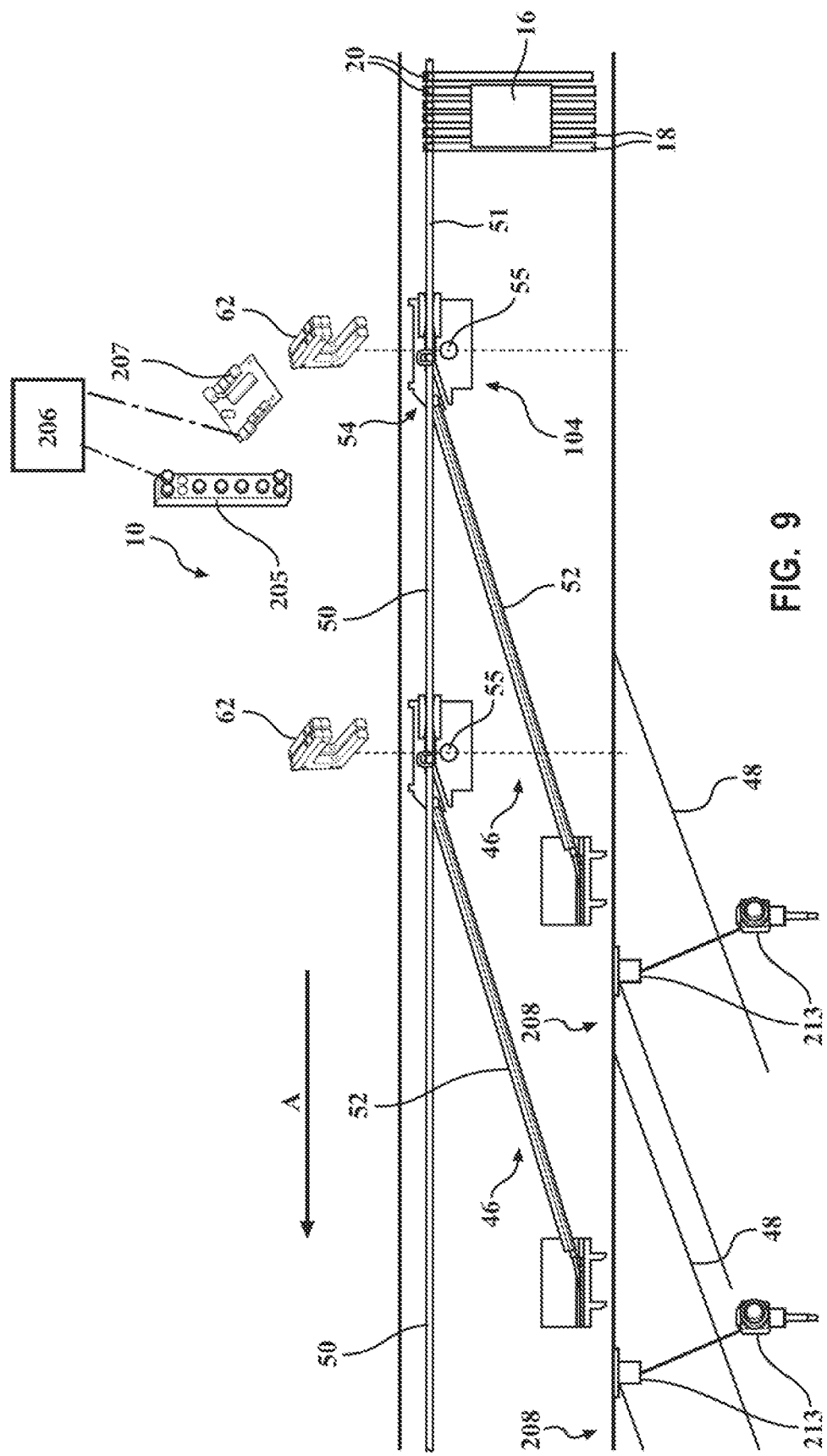
FIG. 9 is a top schematic view of the improved sorting system, illustrating diverting points and distributing mechanisms.

With reference to FIG. 9, the article sorting system 10 includes one or more diverting points 208 at which articles 16 may be removed from the slats 18. The example embodiment includes a plurality of diverting points 208 that are spaced from one another in the direction of travel A. The article sorting system 10 also includes one or more branching mechanisms 46 that are each arranged adjacent to one of the diverting points 208 and configured to selectively laterally divert the shoe 20 to push the article 16 off the slats 18 and onto a branch conveyor 48 at the diverting point 208, or to alternately allow the shoe 20 to advance in the direction of travel without laterally moving the article 16 to the branch conveyor 48. More particularly, each of the branching mechanisms 46 includes a forward guide rail 50 and a movement guide rail 52 that serve as tracks of the guide rollers 44 and thus provide selective movement of the shoes 20 starting at the branching point of the forward and movement guide rails 50, 52. More particularly, the forward guide rail 50 extends in the direction of travel, and thus moves the guide roller 44 in the direction of travel A. The movement guide rail 52 extends at an angle relative to the forward guide rail 50 and toward one of the branching conveyors 48, and thus moves the guide roller 44 at an angle relative to the direction of travel and toward the branching conveyor 48. A distributing mechanism 54 is located at the branch point of the forward guide rail 50 and the movement guide rail 52 and selectively directs the guide roller 44 along either the forward guide rail 50 and movement guide rail 52 to provide corresponding movement of the shoe 20. A forward guide rail 50 of a previous segment of the sorter 10 is connected to an upstream end of the distributing mechanism 54 such that the distributing mechanism 54 is connected to two forward guide rails 50 and the movement guide rail 52.

As further shown in FIG. 9, each distributing mechanism 54 includes an actuator 55 (schematically shown) such as a solenoid 55 or electromagnet that is electrically connected to the controller 206 and configured to selectively assign a trajectory of the guide roller 44 along one of the forward and movement guide rails 50, 52. More particularly, each actuator 55 may be electrically connected to a local input output device 205 and local solenoid board 207 for controlling a voltage pattern to the actuator 55 during actuation. The local input output device 205 and solenoid board 207 may be electrically connected to the controller 206 for transmitting and receiving signals to and from the controller 206. More particularly, when the actuator 55 is activated, the guide roller 44 is guided to the movement guide rail 52 to cause lateral movement of the shoe 20, and when the solenoid 55 is not activated, the guide roller 44 moves forward along the forward guide rail 50 to cause movement of the shoe 20 in the direction of travel A. Accordingly, the solenoid 55 allows the direction of the guide roller 44 and shoe 20 to instantly be switched for branching to the diverting point 208 and associated branch conveyor 48 based on commands from the controller 206. It should be appreciated that other types of actuators could be employed.

In order to return a moved shoe 20 to an original position after lateral movement, a return rail (not shown) on which the guide roller 44 can be moved to return to the forward guide rails 50 is provided in a back run of the conveyance route. Furthermore, one or more additional guide rails 50 may be provided on the laterally opposite side of the slats 18 to allow the shoes 20 to travel along the opposite side of the system and thus permit diverting shoes 20/articles 16 in the opposite lateral direction to branching conveyors 48 on the opposite side. Branching mechanisms 46 may be provided for transferring shoes between the guide rails 50.

Figure 10:
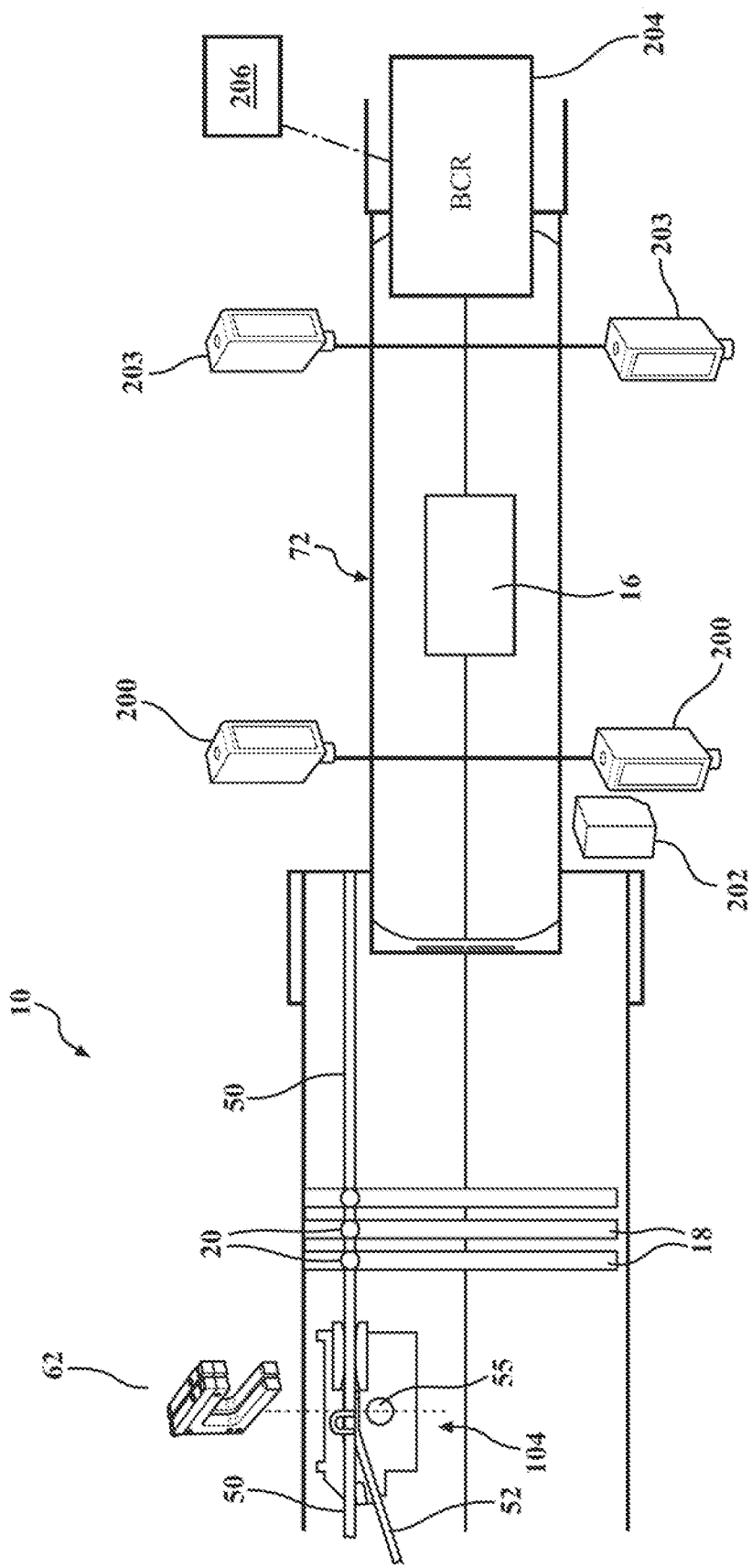
FIG. 10 is a top schematic view of the improved sorting system, illustrating a carry-in conveyor, an induct photo eye, width measurement photo eye, a tracking photo eye and a barcode reader.

As shown in FIG. 10, a carry-in conveyor 72 is provided for delivering articles 16 to the slats 18 prior to sorting of the articles 16. As shown in FIG. 10, the controller 206 may be located in an enclosure located adjacent to the carry-in conveyor 72. However, the controller 206 may be located at other locations. An entrance detection device 200, such as an induct photo eye 200, is located along the carry-in conveyor 72, and is configured to detect the delivery of an article 16 from the carry-in conveyor 72 to the slats 18 and to identify which slats 18 the article 16 is delivered to, and their associated slat numbers. It should be appreciated that other types of detectors may be used to determine what slats 18 articles 16 are positioned on. The entrance detection device 200 may also configured to identify a lateral location of the article 16 on the slats 18, e.g., on the left side of the slats 18, and a length and width of the article 16. A separate width measurement detector 202, such as a photo eye 202 may also be provided for measuring a width of the article 16. Additionally, a barcode reader 204 may be located adjacent to the carry-in conveyor 72 upstream of the induct photo eye 200 and configured to detect identifying information associated with the article 16 such that the identifying information associated with the barcode on the article 16 can be used to determine movement of the article 16. A tracking photo eye 203 is located downstream of the barcode reader 204 for tracking a location of the article 16 along the carry-in conveyor 72. All of the detections from the aforementioned devices may be transmitted to the controller 206 for coordinating subsequent movement of the article 16. Based on these detections, the controller 206 is configured to build a slat table which includes at least an identification of the articles 16, the slat numbers of the slats 18 upon which each of the articles 16 are positioned, and diverting points 208 at which the article should be removed from the slats 18. The slat table may include other pieces of information associated with the articles 16, such as a detected length, width and lateral location of the article 16 and data from the barcode reader 204 to further manage movement of the articles 16 along the sorter 11.

With reference back to FIG. 9, at least one diversion detection device 62 is located in substantial alignment with each of the distributing mechanisms 54. The diversion detection device 62 is configured to identify a presence of each of the slats 18 as they pass by the diversion detection device 62 in the direction of travel and to notify the controller 206 of the detection. Moreover, the controller 206 is configured to determine the slat number of each of the slats 18 as the article passes by the diversion detection device 62 based on the reading from the diversion detection device 62, and to reference the slat table to instantly determine whether the article 16 positioned on the slat 18 associated with the detected slat number should be removed from the article slat 18 at the diverting point 208, and to actuate the actuator 55 in response to a determination that the article 16 should be removed from the slat 18.

Figure 11:
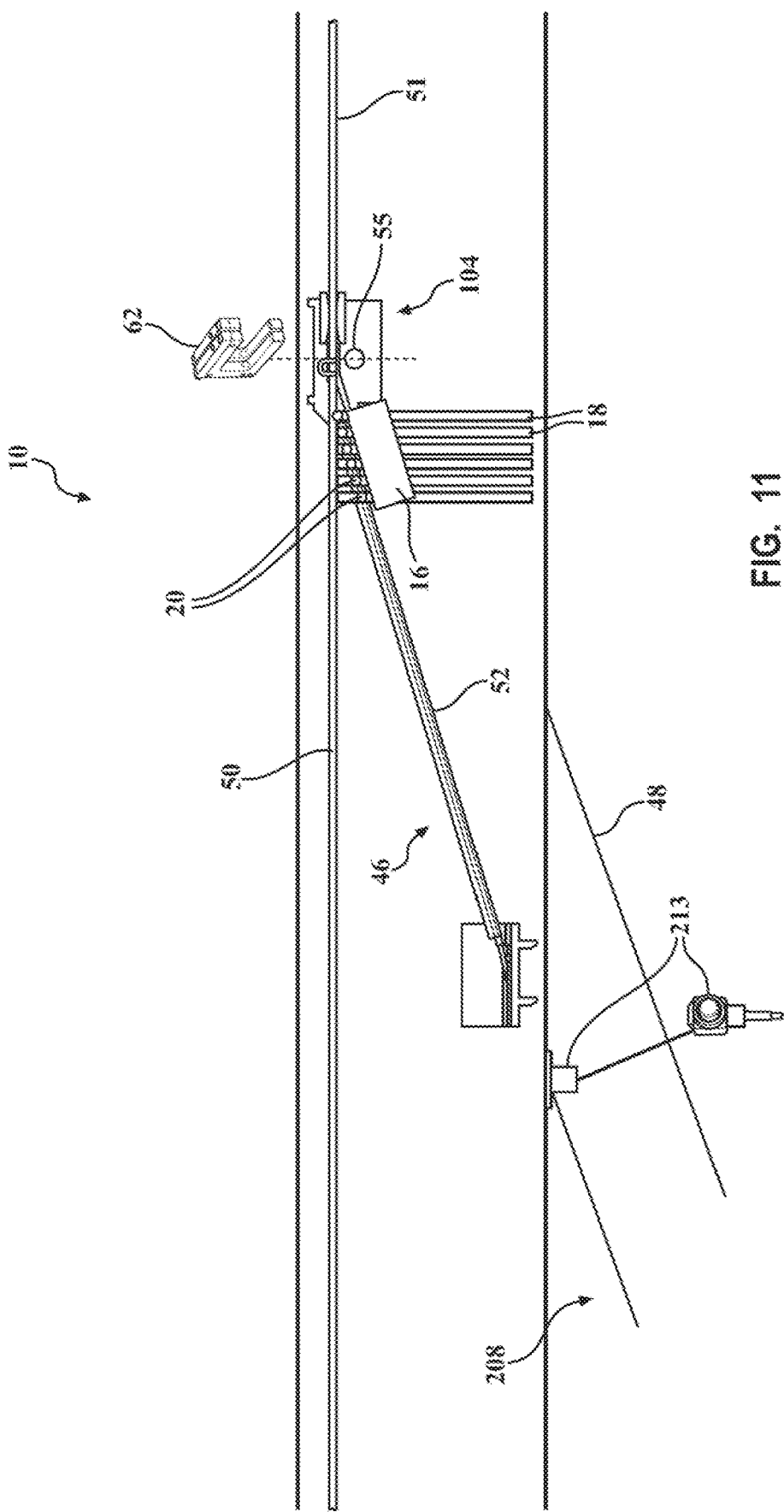
FIG. 11 is a top schematic view of the improved sorting system, illustrating movement of an article in response to transverse movement of shoes at a diverting point.

The controller 206 is configured to detect the reference slat 18a with the diversion detection device 62 as the first slat and to count up from the reference slat 18a in order to keep track of which slat 18 is detected. When the reference slat passes by the diversion detection 62 again, the count is restarted. When the first slat 18 upon which an article 16 is supported arrives at a distributing mechanism 54, a reading from the diversion detection device 62 is transmitted to the controller 206, and the controller 206 is configured to instantaneously determine whether the article 16 should be diverted, and whether the article 16 is clear for diversion. If this is the case, the solenoid 55 is activated to cause the article 16 to be diverted via the shoes 20 associated with the slats 18 upon which the article 16 is located. For example, FIG. 11 illustrates a plurality of shoes 20 that have started moving in response to commands from the controller 206. Once the final slat 18 upon which the article 16 is positioned has passed the solenoid 55, the solenoid 55 is de-energized to prevent subsequent shoes 20 from transversely moving. If the controller 206 determines that additional shoes 20 are needed (e.g., upon backward movement of the article 16), additional shoes 20 are activated to complete the diversion. It should be appreciated that the previously mentioned width, length and lateral position measurements of the article 16 may be processed by the controller 206 to determine which shoes 20 should activated, and an extent to which the shoes 20 should be moved laterally in order to unload the article 16 at the branch conveyor 48. Upon diversion of the article 16, a status of the slats 18 previously associated with the article 16 will indicate that the article 16 was diverted.

The substantially aligned relationship of the diversion detection device 62 with the distributing mechanism 54 in the direction of travel A allows the controller 206 to actuate the actuator 55 and cause movement of the shoe 20 immediately upon a determination that that the article 16 positioned on the slat 18 associated with the detected slat number should be diverted. More particularly, the diversion detection device 62 may be substantially aligned with the actuator 55. Accordingly, accurate tracking of the slates 18 and triggering of the actuator 55 can occur at any speed. The subject system 10 is arranged differently than systems in which a gap is present in the direction of travel between the diversion detection device and distributing mechanism, and thus require calculations to be taken associated with variables such as travel speed, distance and time to determine the time at which the actuator should be triggered to properly time the movement of shoes and removal of articles from the slats. Moreover, because readings are taken local to each position, there is no tracking file required and no "tracking position" to be set up. Furthermore, calibration of the sorting system 10 is not required and chain stretch does not need to be factored into the slat location detection process.

In order to determine the presence of the slats 18 by the diversion detection device 62, each of the slats 18 includes a detection plate 60A, 60B for being detected by the diversion detection device 62. Embodiments of the detection plates 60A, 60B and detection device 62 are presented in FIGS. 14-19B. According to these embodiments, the detection plates 60A, 60B includes a reference detection plate 60A and a plurality of standard detection plates 60B. The single reference detection plate 60A is provided on the single reference slat 18A in order to serve as an identifier of the single reference slat 18A to the controller 206, while a single standard detection plate 60B is provided on the rest of the slats 18.

More particularly, as shown in FIGS. 14, 16 and 18A-18B, the reference detection plate 18A defines an opening 216 that is detectable by the diversion detection device 62 to determine the presence of the reference detection plate 60A. The standard detection plates 60B do not include such an opening 216. The absence of the opening 216 is also detectable by the diversion detection device 62 for identifying the presence of the standard detection plates 60B. According to the example embodiment best shown in FIG. 16, a pair of the detection devices 62 are provided adjacent to one another in the direction of travel at any number of locations along the sorting system 10. A single mount may be used for supporting the pair of diversion detection devices 62. The presence of the reference detection plate 60A is determined in response to one of the pair of diversion detection devices 62 being aligned with the opening 216 of the reference detection plate 60A in the direction of travel and in a vertical direction that is perpendicular to the direction of travel, and the other of the pair of detection devices 62 being aligned with a flat region 61 of the reference detection plate 60A away from opening 216 in the direction of travel and vertical direction simultaneously. On the other hand, the presence of the standard detection plates 60B is determined in response to both of the pair of diversion detection devices 62 being aligned with flat regions 61 standard detection plate 60B in the direction of travel and vertical direction simultaneously. As further shown, each of the detection plates 60A, 60B defines a slot 221 which partially receives the side roller 26 for allowing the side roller 26 to rotate during movement of the reference plate 60A, 60B. This further provides a compact arrangement of the detection plates 60A, 60B.

Figure 16:
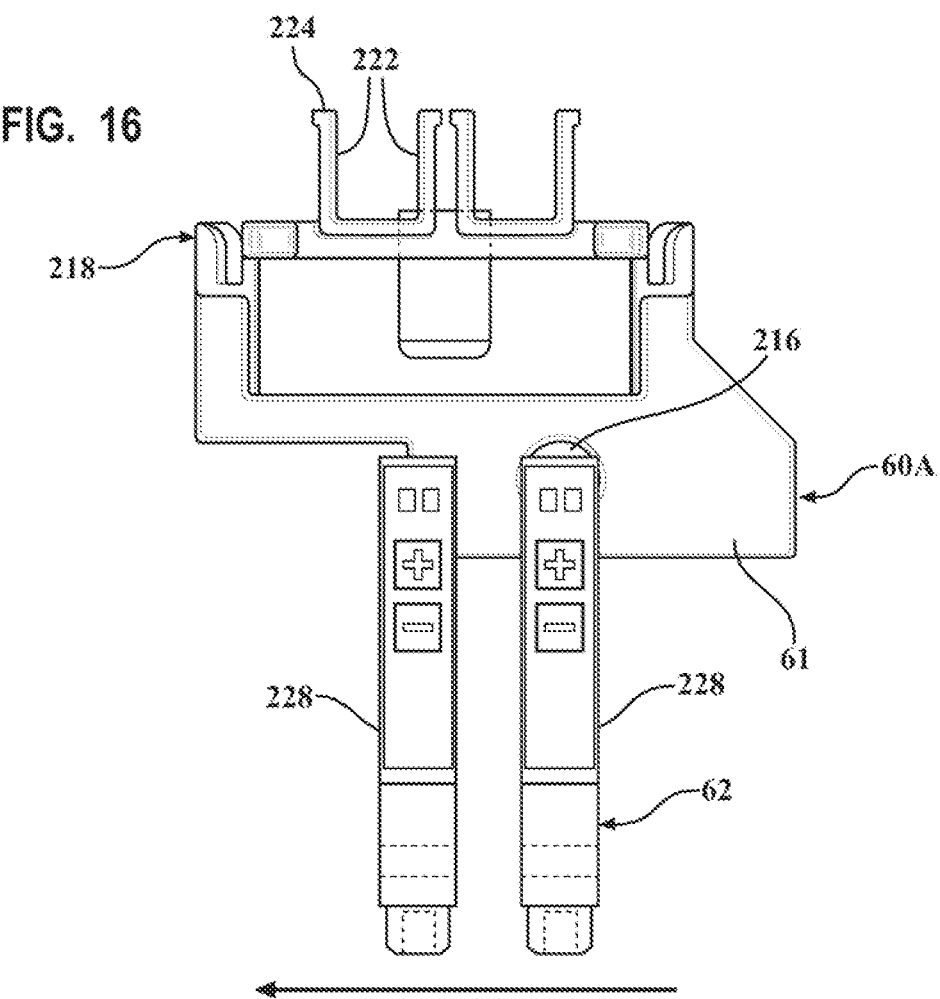
FIG. 16 is a side view of the reference detection plate and a pair of detection devices of the improved sorting system.
Figure 17:
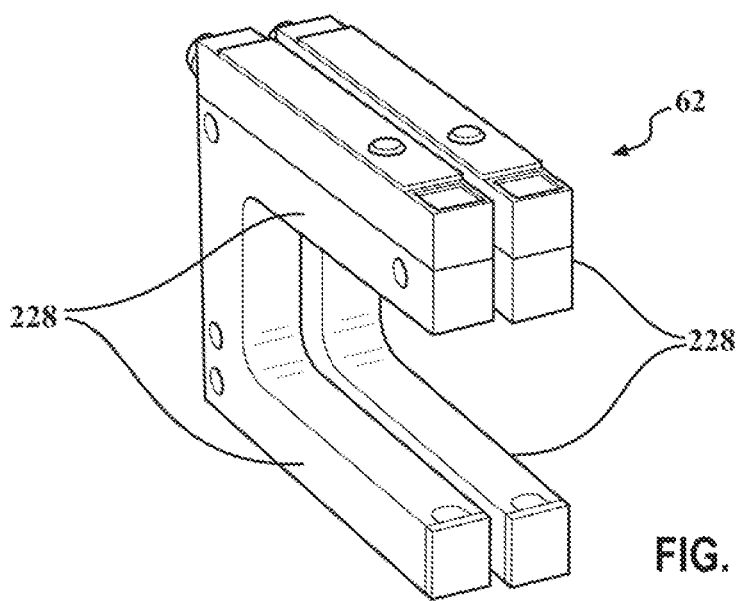
FIG. 17 is a top perspective view of a pair of detection devices of the improved sorting system.

As further illustrated in FIGS. 16-17, each of the diversion detection devices 62 may be a light operated sensor having a U-shape with a pair of legs 228 being spaced from one another to allow the detection plates 60A, 60B to pass between the legs 228. Furthermore, one of the legs 228 of the pair of legs 228 is a light emitting device and the other of the legs 228 of the pair of legs 228 is a light receiving device such that the presence of the detection plates 60A, 60B can be detected in response to a break in transmission of light between the light emitting device and light receiving device. It can be appreciated that the dimensions of the detection plates 60A, 60B permit the detection plates 60A, 60B to pass between the legs 228 of the diversion detection devices 62.

Because the diversion detection devices 62 are configured to identify the reference detection plate 60 and associated reference slat 18A as well as the standard plates 60A and associated slats 18, the reference slat 18A is able to be identified at any location along the sorter 11 at which diversion detection devices 62 are located, including all diverting points 208, regions of shoe pin detection mechanisms 210 (discussed below), the end of system 10 or any other decision point.

Additionally, because the opening 216 is employed to distinguish the reference detection plate 60A from the standard detection plates 60B, only a single detection plate 60A, 60B is required on each slat 18 to identify the difference between the reference and standard slats 18A, 18 and to identify the locations of the slats 18A, 18. Additionally, because of this arrangement of the reference and standard detection plates 60A, 60B, the diversion detection devices 62 are only required along a single side of the slats 18 at each location for detecting the presence of the detection plates 60A, 60B. This is contrary to systems in which detection plates are provided on both sides of a reference slat in order to distinguish it from other standard slats, thus requiring detection devices on both sides of the slats in order to distinguish a reference detection plate from standard detection plates. The absence of additional detection plates and diversion detection devices provides significant costs savings in materials, especially for long sorting systems 10, and also simplifies the overall construction of the system 10, thus minimizes the risk of issues.

Figure 18A:
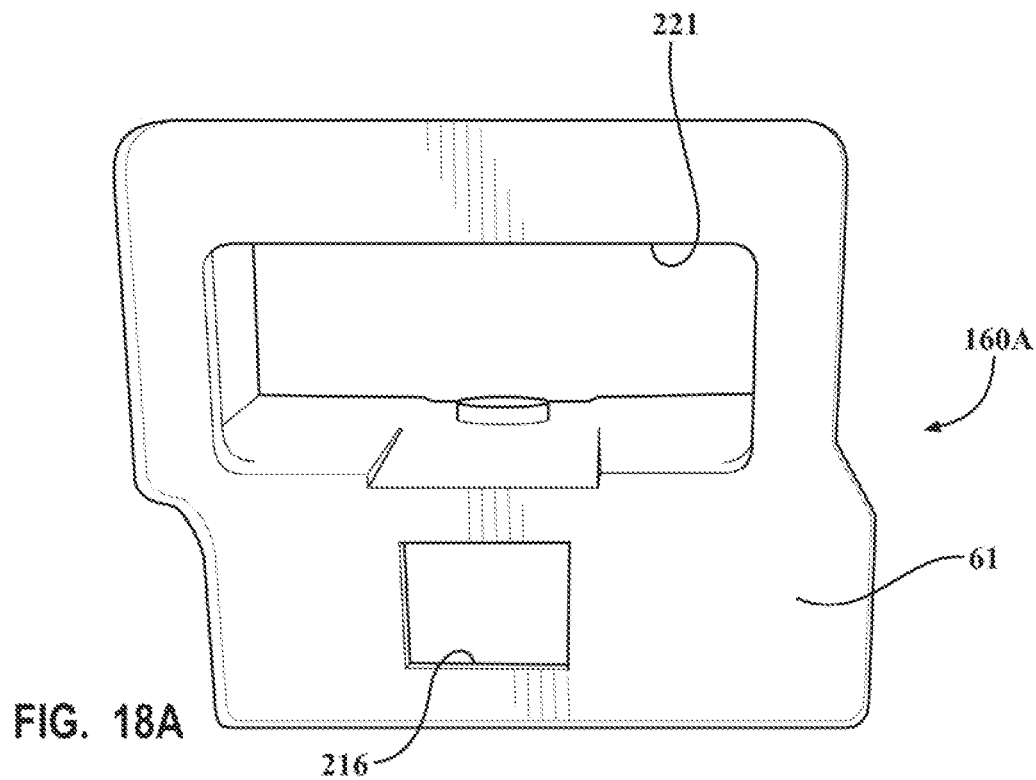
FIG. 18A is a right side perspective view of an alternate embodiment of a reference detection plate.
Figure 18B:
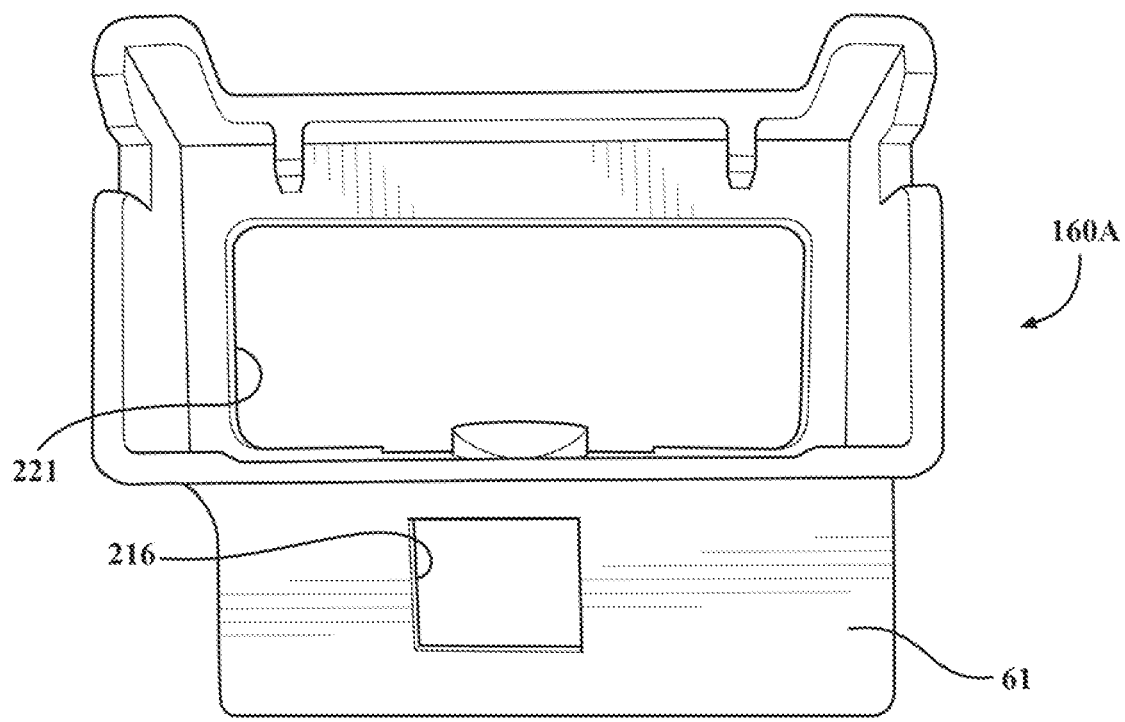
FIG. 18B is a left side perspective view of the alternate embodiment of the reference detection plate.
Figure 19A:
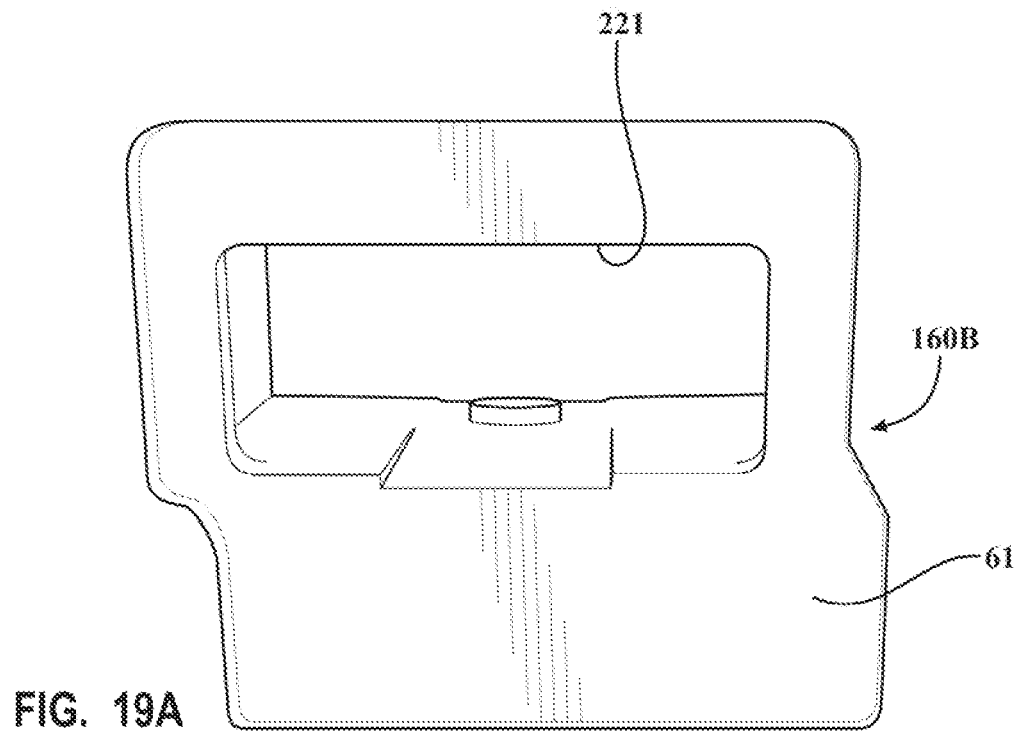
FIG. 19A is a right side perspective view of an alternate embodiment of a standard reference detection plate.
Figure 19B:
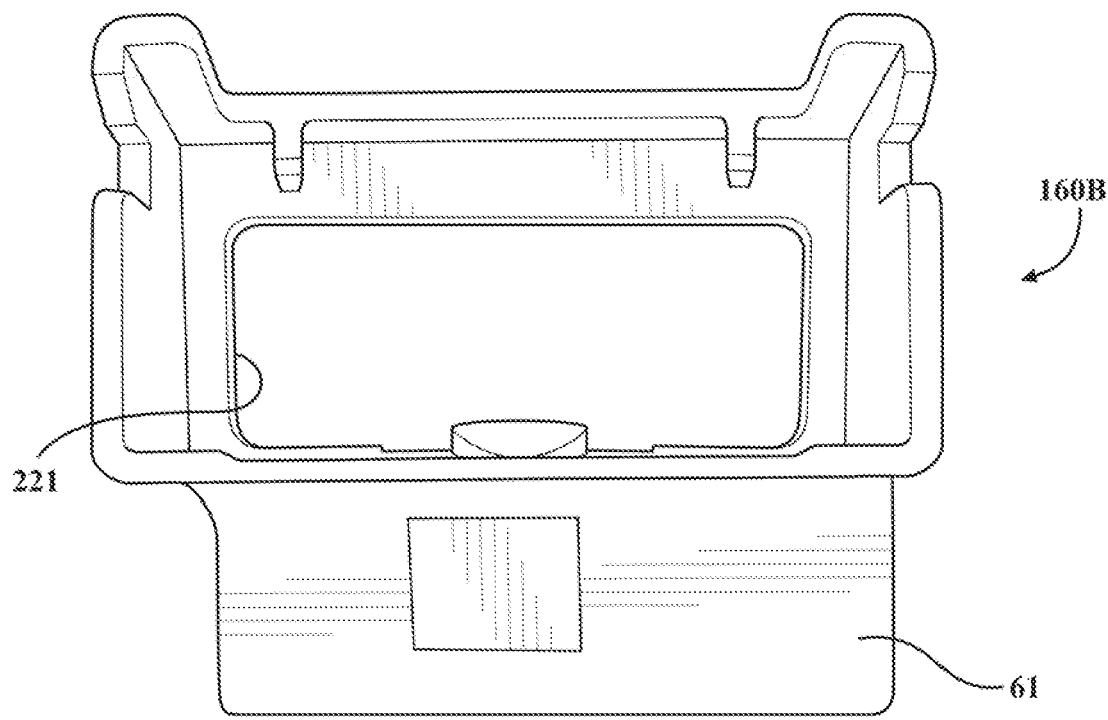
FIG. 19B is a left side perspective view of the alternate embodiment of the standard reference detection plate.

FIGS. 18A-19B present an additional embodiment of the detection plates 160A, 160B. More particularly, FIGS. 18A-18B present a reference detection plate 160A, and FIGS. 19A-19B present a standard detection plate 160B. As shown, according to this embodiment, the opening 216 of the reference detection plate 160A has a square-shape, contrary to the previously described embodiment which has a circular-shaped opening 216 to provide different detecting characteristics. It should be appreciated that other shapes could be used.

Figure 14:
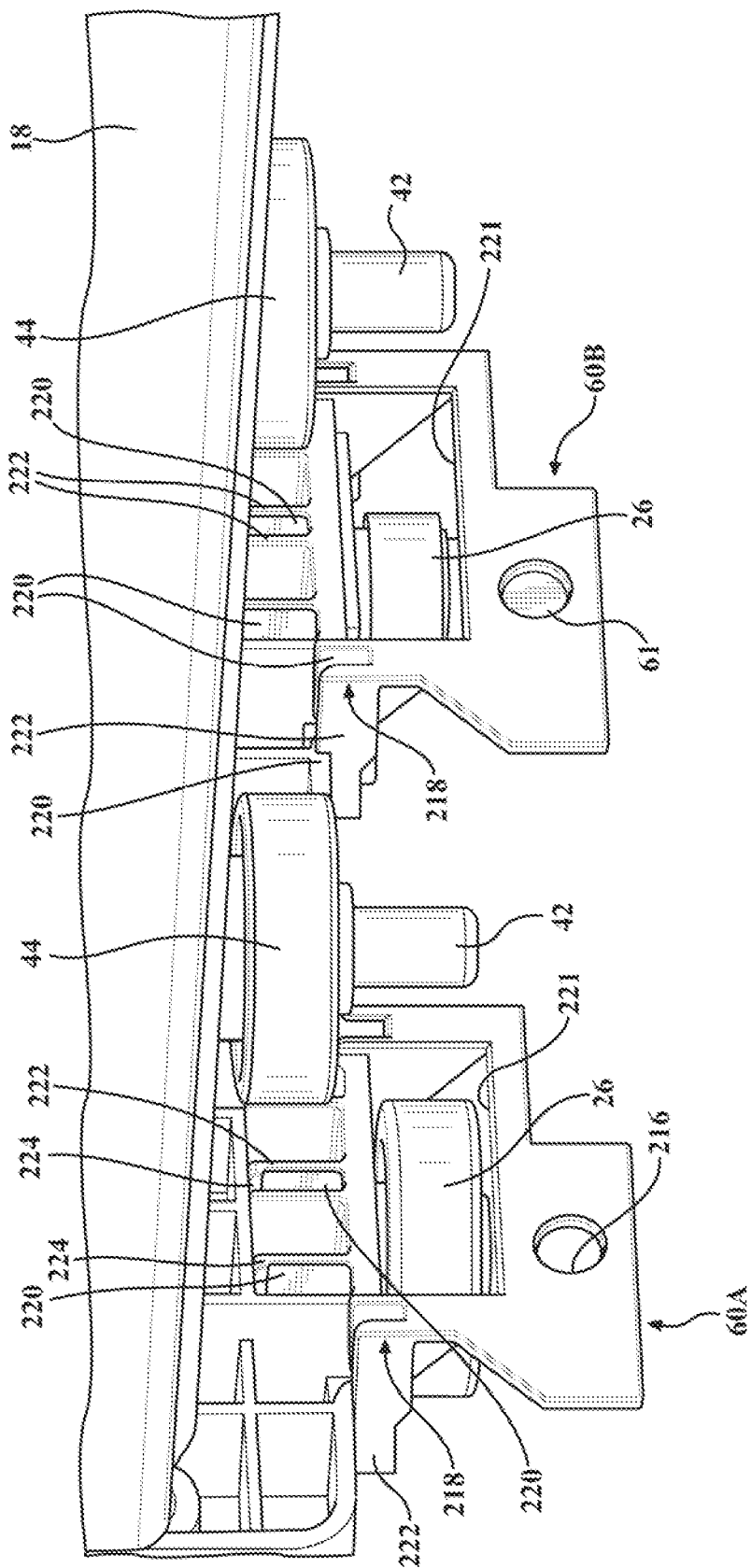
FIG. 14 is side perspective view of reference and standard detection plates of the improved sorting system.
Figure 15A:
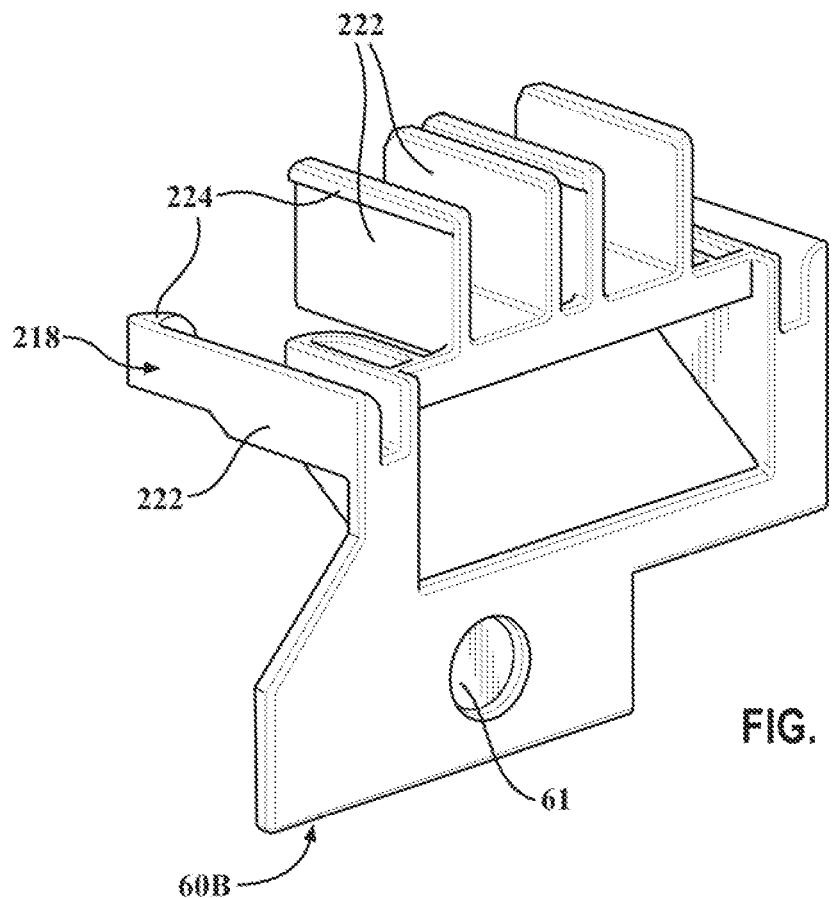
FIG. 15A is a right side perspective view of the standard detection plate.
Figure 15B:
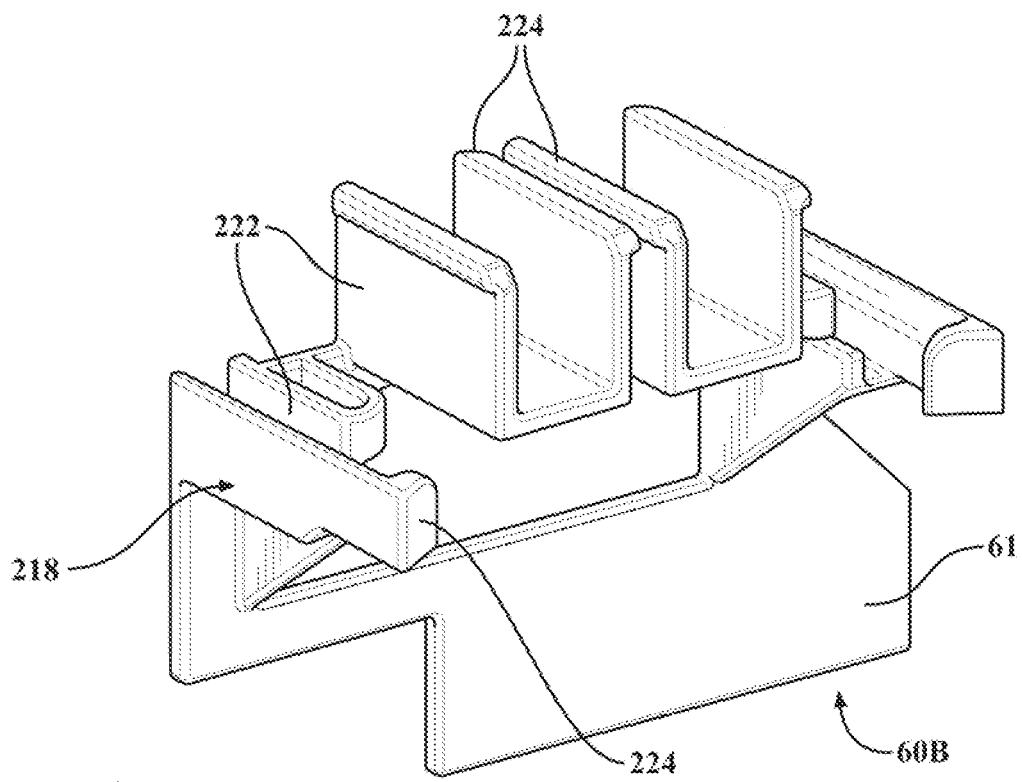
FIG. 15B is a left side perspective view of the standard detection plate.

As best illustrated in FIG. 14, each of the detection plates 60A, 60B is connectable to one of the slats 18 with a snap-fit connection 218 adjacent to a lateral end 226 of one of the slats 18 to simplify connecting the detection plates 60A, 60B to the slats. This is advantageous over conventional systems which include welded or bolted connections to the slats because the snap-fit connection 218 allows the detection plates 60A, 60B to be quickly and easily connected and disconnected during initial setup and repairs and retrofitting onto existing slats 18, thus reducing installation costs. More particularly, the snap-fit connection 218 includes at least one connecting member 220 that extends from the slat 18, and at least one connecting leg 222 that extends from the detection plate 60A, 60B. As shown, an end of one or more of the connecting legs 222 includes a tab 224 such that the connecting leg 222 can flexibly connect to the connecting member 220. As shown, the at least one connecting member 220 may include a plurality of connecting members 220. Likewise, the at least one connecting leg 222 can include a plurality of connecting legs 222, with each of the connecting legs 222 is configured to flexibly connect to one of the connecting members 220. By utilizing a snap-fit connection 218, all spacers and hardware typically required to hold the detection plate are eliminated, and the components of the snap-fit connection 218 may be comprised of inexpensive plastic materials, thus reducing material costs.

Figure 12:
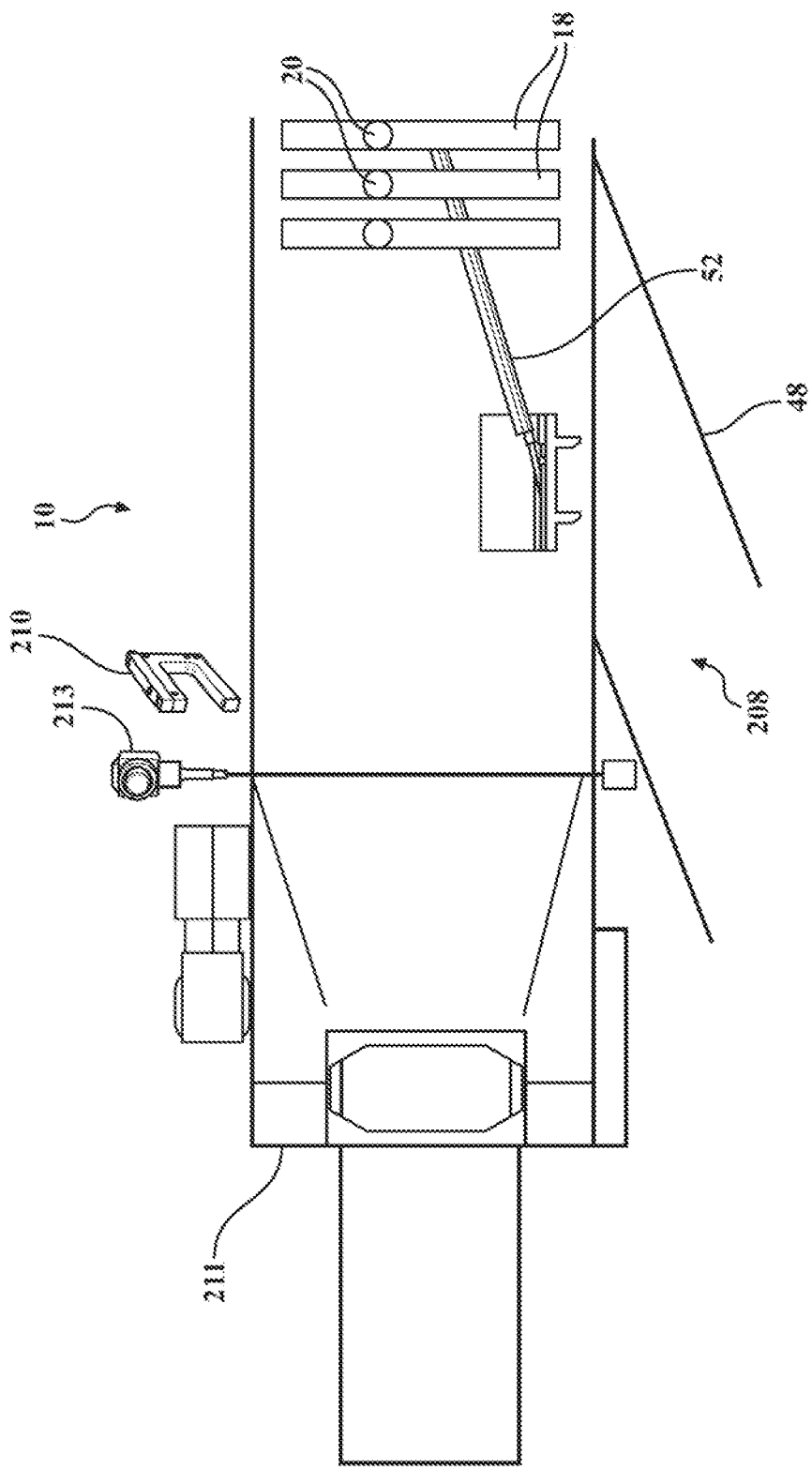
FIG. 12 is a top schematic view of an end of the improved sorting system.

As will be discussed in the following, the system 10 may include various other features for tracking the slats 18 and confirming that the system operates effectively. More particularly, as shown in FIG. 12, a shoe pin confirmation mechanism 210 may be located adjacent to an end 211 of the sorting system 10 (and/or any other location of the system 10) for determining a location of the shoe pins 42 of the slats 18 and reporting the determined location to the controller 206. Once each slat 18 is adjacent the end 211 of the slats 18, it is confirmed whether an electronic status of the slat 18 saved in the controller 206 indicates that an article 16 was removed or is still present on the slat 18, and a location of the shoe pins 42 is detected with the shoe pin confirmation mechanism 210. If the status indicates that an article 16 is not present on the slat 18 and the shoe pins 42 have returned to their original position, it is confirmed that an article 16 is not present on the slat 18. This provides accountability of every slat 18 on the sorting system 10 at all times and allows diversion issues to be detected and alarmed.

Figure 13:
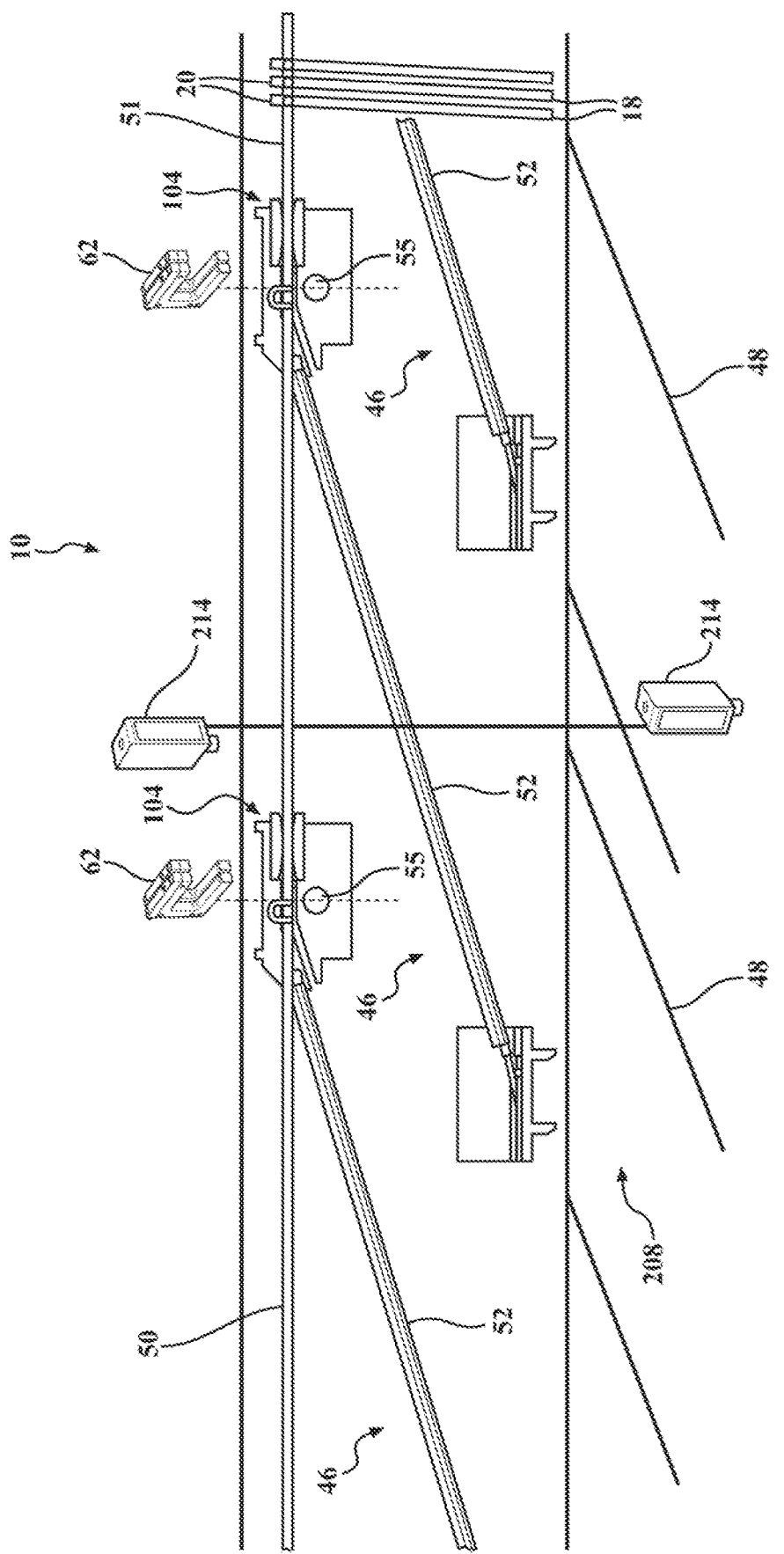
FIG. 13 is a top schematic view of the improved sorting system, illustrating a plurality of the diverting points.

As shown in FIG. 13, one or more broken shoe pin detectors 214 may be located at various locations along the sorting system 10. According to an embodiment, the broken shoe pin detector 214 is a light operated sensors, but other types of sensors may be used. During use, as slats 18 pass the broken shoe pin detector 214, the broken shoe pin detector 214 detects the presence of shoe pins 42, and if a shoe pin 42 is not detected in association with each slat 18, the controller 206 indicates that a broken shoe pin 42 is present. It should be appreciated that no timers are associated with the broken pin detection 214, and the broken shoe pin detector 214 works at all speeds without adjustment.

FIGS. 9 and 11-12 illustrated that jam detection sensors 213, such as photo eyes 213, may be provided at various locations of the system 10 for detecting jamming of the articles 16. For example, jams may be detected in response to a jam detection sensor 213 being blocked for distance equal to 1.5 times the length of the longest article 16 presently on the system 10. This allows for fast stopping of the system 10 when a jam condition occurs.

Figure 20:
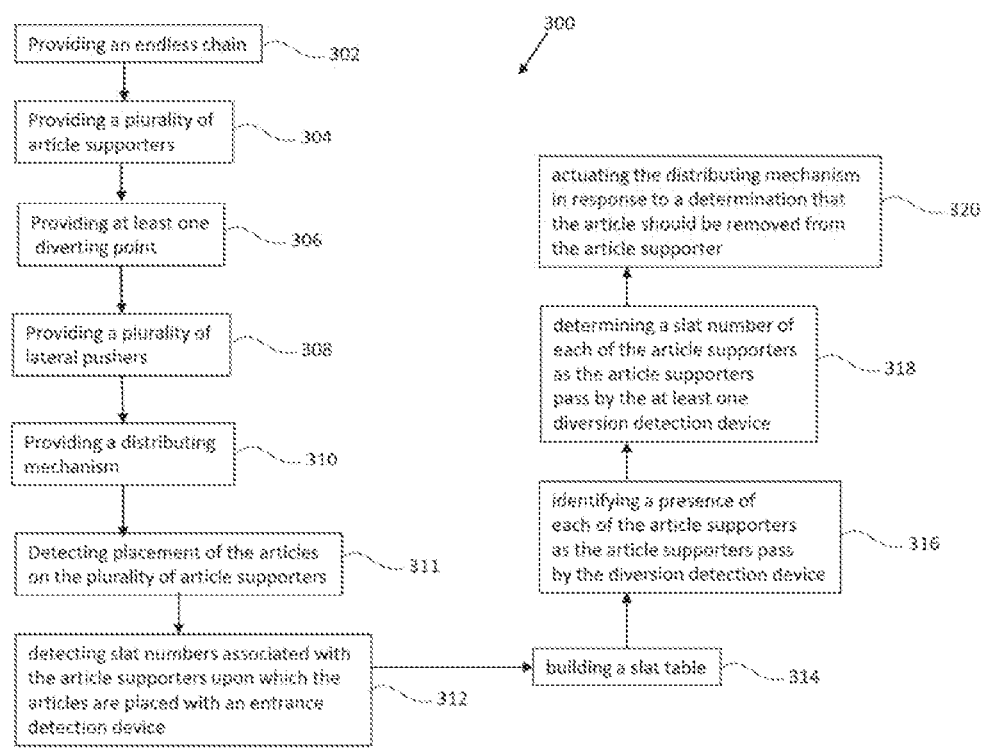
FIG. 20 is a flow diagram of a method for sorting articles.

In view of the foregoing and with reference to FIG. 20, a method 300 for sorting articles 16 is provided. The method 300 includes 302 providing an endless chain 14 rotated along a conveyance route by a rotation drive device 12a. The method further includes 304 providing a plurality of article supporters 18 attached to the endless chain 14 for moving the articles 16 in a direction of travel A along the conveyance route by the endless chain 14, wherein each of the article supporters 18 has a slat number associated with it. The method further includes 306 providing at least one diverting point 208 at which the articles 16 may be removed from the article supporters 18. The method also includes 308 providing a plurality of lateral pushers 20 that are each attached to one of the article supporters 18, wherein the lateral pushers 20 are each movable along the article supporter 20 so as to selectively laterally push the articles 16 off of the article supporters 18 at the at least one diverting point 208. The method further includes 310 providing a distributing mechanism 54 configured to initiate the movement of the lateral pushers 20. The method also includes 311 detecting placement of the articles 16 on the plurality of article supporters 18 and 312 detecting slat numbers associated with the article supporters 18 upon which the articles 16 are placed with an entrance detection device 200. The method further includes 314 building a slat table including an identification of the articles 16, the slat numbers of the article supporters 18 upon which the articles 16 are placed and one of the diverting points 208 at which the articles 16 should be removed. The method also includes 316 identifying a presence of each of the article supporters 18 as the article supporters 18 pass by the detection device 62 in the direction of travel A with at least one diversion detection device 62. The step 316 may further include determining the presence of the reference detection plate 60A based on a detection of the opening 216 being aligned with the diversion detection device 62. The step 316 may also include referencing the slat table. The method further includes 318 determining a slat number of each of the article supporters 18 as the article supporters 18 pass by the at least one diversion detection device 62 with a controller 206 to determine whether the article 16 positioned on the article supporter 18 associated with the detected slat number should be removed from the article supporter 18 at the diverting point 208. The method continues with 320 actuating the distributing mechanism 54 in response to a determination that the article 16 should be removed from the article supporter 18, wherein the at least one diversion detection device 62 is substantially aligned with the distributing mechanism 54 in the direction of travel such that the control system 206 may actuate the distributing mechanism 54 immediately after a determination that the article 16 positioned on the article supporter 18 associated with the detected slat number should be removed from the article supporter 18.

Although embodiments of the present invention are described above, the present invention is not limited to the above embodiment. Furthermore, aspects of the embodiments may be mixed with one another.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for sorting articles, comprising:
   a rotation drive device;
   an endless chain rotatable along a conveyance route extending along an axis by the rotation drive device;
   a plurality of article supporters attached to the endless chain for axially moving the articles in a direction of travel along the conveyance route by the endless chain, each of the article supporters having a slat number associated with the article supporter;
   at least one diverting point at which the articles may be removed from the article supporters;
   a plurality of lateral pushers each attached to one of the article supporters, wherein the lateral pushers are each movable along the article supporter so as to selectively laterally push the articles off of the article supporters at the at least one diverting point;
   a distributing mechanism configured to initiate the movement of the lateral pushers;
   at least one diversion detection device configured to identify a presence of each of the article supporters as the article supporters pass by the detection device in the direction of travel;
   a controller configured to determine the slat number of each of the article supporters as the article supporters pass by the at least one diversion detection device to determine whether the article positioned on the article supporter associated with the detected slat number should be removed from the article supporter at the diverting point, and to actuate the distributing mechanism in response to a determination that the article should be removed from the article supporter; and
   the at least one diversion detection device being substantially aligned with the distributing mechanism relative to the direction of the axis and relative to the direction of travel such that the article supporters are in axial alignment with the at least one diversion detection device and the distributing mechanism at substantially the same time, and such that the control system may actuate the distributing mechanism immediately after a determination that the article positioned on the article supporter associated with the detected slat number should be removed from the articles supporter.

2. The system as set forth in claim 1, further including an entrance detection device configured to detect placement of the articles on the plurality of article supporters and to detect slat numbers associated with the article supports upon which the articles are placed.

3. The system as set forth in claim 2, wherein the at least one diverting point includes a plurality of diverting points, wherein the controller is configured to build a slat table including an identification of the articles, the slat numbers upon which the articles are placed, and one of the diverting points at which the articles should be removed, and wherein the step of determining whether the article positioned on the article supporter associated with the detected slat number includes referencing the slat table.

4. A system for sorting articles, comprising:
   a rotation drive device;
   an endless chain rotatable along a conveyance route by the rotation drive device;
   a plurality of article supporters attached to the endless chain for moving the articles in a direction of travel along the conveyance route by the endless chain, each of the article supporters having a slat number associated with the article supporter;
   at least one diverting point at which the articles may be removed from the article supporters;
   a plurality of lateral pushers each attached to one of the article supporters, wherein the lateral pushers are each movable along the article supporter so as to selectively laterally push the articles off of the article supporters at the at least one diverting point;
   a distributing mechanism configured to initiate the movement of the lateral pushers;
   at least one diversion detection device configured to identify a presence of each of the article supporters as the article supporters pass by the detection device in the direction of travel;
   a controller configured to determine the slat number of each of the article supporters as the article supporters pass by the at least one diversion detection device to determine whether the article positioned on the article supporter associated with the detected slat number should be removed from the article supporter at the diverting point, and to actuate the distributing mechanism in response to a determination that the article should be removed from the article supporter; and
   the at least one diversion detection device being substantially aligned with the distributing mechanism in the direction of travel such that the control system may actuate the distributing mechanism immediately after a determination that the article positioned on the article supporter associated with the detected slat number should be removed from the article supporter;
   a plurality of detection plates, wherein at least one of the plurality of detection plates is connected to each of the article supporters;
   wherein the at least one diversion detection device is configured to detect the plurality of detection plates as the plurality of detection plates pass the detection device in the direction of travel;
   wherein the plurality of detection plates includes at least one reference detection plate connected to a reference article supporter of the plurality of article supporters, and a plurality of standard detection plates each connected to one of a plurality of standard article supporters of the plurality of article supporters;

wherein the at least one reference detection plate defines an opening aligned with the detection device when the reference detection plate passes by the detection device in the direction of travel for determining the presence of the reference detection plate.

5. The system for sorting articles as set forth in claim 4, wherein the opening is aligned with the at least one diversion detection device in a vertical direction being perpendicular to the direction of travel when the reference detection plate passes by the detection device in the direction of travel.

6. The system for sorting articles as set forth in claim 4, wherein the at least one diversion detection device includes at least a pair of diversion detection devices located adjacent to one another in the direction of travel, and wherein the presence of the reference detection plate is determined in response to one of the pair of diversion detection devices being aligned with the opening of the reference detection plate in the direction of travel and the other of the pair of diversion detection devices being aligned with a portion of the reference detection plate separate from the opening in the direction of travel simultaneously.

7. The system for sorting articles as set forth in claim 6, wherein the presence of the standard detection plates is determined in response to both of the pair of diversion detection devices being aligned with the detection plate simultaneously.

8. The system for sorting articles as set forth in claim 4, wherein each of the detection plates are located adjacent to a lateral end of one of the article supporters in a direction transverse to the direction of travel.

9. The system for sorting articles as set forth in claim 4, wherein each of the diversion detection devices is a light operated sensor having a U-shape with a pair of legs being spaced from one another to allow the detection plates to pass between the legs.

10. The system for sorting articles as set forth in claim 9, wherein one of the legs of the pair of legs is a light emitting device and wherein the other of the legs of the pair of legs is a light receiving device such that detection plates are detected in response to the detection plates interfering with light transmission from the light transmitting device to the light receiving device.

11. The system for sorting articles as set forth in claim 4, wherein each of the detection plates is connectable to one of the article supporters with a snap-fit connection.

12. The system for sorting articles as set forth in claim 11, wherein the snap-fit connection includes at least one connecting member extending from the article support and at least one connecting leg extending from the detection plate, and wherein the connecting leg is configured to flexibly connect to the connecting member.

13. The system for sorting articles as set forth in claim 12, wherein the at least one connecting member includes a plurality of connecting members and wherein the at least one connecting leg includes a plurality of connecting legs, and wherein each of the connecting legs is configured to flexibly connect to at least one of the connecting members.

14. A method for sorting articles, comprising:
providing an endless chain rotated along a conveyance route extending along an axis by a rotation drive device;
providing a plurality of article supporters attached to the endless chain for axially moving the articles in a direction of travel along the conveyance route by the endless chain, each of the article supporters having a slat number associated with the article supporter;
providing at least one diverting point at which the articles may be removed from the article supporters;
providing a plurality of lateral pushers each attached to one of the article supporters, wherein the lateral pushers are each movable along the article supporter so as to selectively laterally push the articles off of the article supporters at the at least one diverting point,
providing a distributing mechanism configured to initiate the movement of the lateral pushers;
identifying a presence of each of the article supporters as the article supporters pass by a detection device in the direction of travel with at least one diversion detection device;
determining a slat number of each of the article supporters as the article supporters pass by the at least one diversion detection device with a controller to determine whether the article positioned on the article supporter associated with the detected slat number should be removed from the article supporter at the diverting point;
actuating the distributing mechanism in response to a determination that the article should be removed from the article supporter;
wherein the at least one diversion detection device is substantially aligned with the distributing mechanism relative to the direction of the axis and relative to the direction of travel such that the article supporters are in axial alignment with the at least one diversion detection device and the distributing mechanism at substantially the same time, and such that the control system may actuate the distributing mechanism immediately after a determination that the article positioned on the article supporter associated with the detected slat number should be removed from the articles supporter.

15. The method as set forth in claim 14, further including detecting placement of the articles on the plurality of article supporters and detecting slat numbers associated with the article supporters upon which the articles are placed with an entrance detection device.

16. The method as set forth in claim 15, wherein the at least one diverting point includes a plurality of diverting points, and wherein the method further includes building a slat table including an identification of the articles, the slat numbers of the article supporters upon which the articles are placed and one of the diverting points at which the articles should be removed, and wherein the step of determining whether the article is positioned on the article supporter associated with the detected slat number includes referencing the slat table.

17. The method as set forth in claim 16, wherein a plurality of detection plates are each connected to one of the article supporters, wherein the at least one diversion detection device is configured to detect the plurality of detection plates as the plurality of detection plates pass the detection device in the direction of travel, wherein the plurality of detection plates includes at least one reference detection plate connected to a reference article supporter of the plurality of article supporters, and a plurality of standard detection plates each connected to one of a plurality of standard article supporters of the plurality of article supporters, wherein the at least one reference detection plate defines an opening aligned with the detection device when the reference detection plate passes by the detection device, and wherein the method further includes determining the presence of the reference detection plate based on a detection of the opening being aligned with the diversion detection device.

18. The method as set forth in claim 17, wherein the opening is aligned with the at least one diversion detection device in a vertical direction being perpendicular to the direction of travel when the reference detection plate passes by the detection device in the direction of travel.

19. The method as set forth in claim 18, wherein the at least one diversion detection device includes at least a pair of diversion detection devices located adjacent to one another in the direction of travel, and wherein the presence of the reference detection plate is determined in response to one of the pair of diversion detection devices being aligned with the opening of the reference detection plate in the direction of travel and the other of the pair of diversion detection devices being aligned with a portion of the reference detection plate separate from the opening in the direction of travel simultaneously.

20. The method as set forth in claim 17, wherein each of the detection plates is connectable to one of the article supporters with a snap-fit connection.

\* \* \* \* \*